(12) United States Patent
Das et al.

(10) Patent No.: US 10,894,613 B2
(45) Date of Patent: Jan. 19, 2021

(54) SEARCHLIGHT AUTO-LAND SYSTEM

(71) Applicant: HONEYWELL INTERNATIONAL INC., Morris Plains, NJ (US)

(72) Inventors: Shouvik Das, Tamil Nadu (IN); Sunit Kumar Saxena, Karnataka (IN); Rafeek Sainudeen, Karnataka (IN); Naman Rawal, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 326 days.

(21) Appl. No.: 16/208,930

(22) Filed: Dec. 4, 2018

(65) Prior Publication Data

US 2020/0172264 A1 Jun. 4, 2020

(51) Int. Cl.
*B64D 47/02* (2006.01)
*B64D 45/04* (2006.01)
*F21S 8/00* (2006.01)
*G08G 5/02* (2006.01)

(52) U.S. Cl.
CPC ............. *B64D 47/02* (2013.01); *B64D 45/04* (2013.01); *F21S 8/003* (2013.01); *G08G 5/02* (2013.01); *G08G 5/025* (2013.01)

(58) Field of Classification Search
CPC ......... B64D 47/02; B64D 45/04; F21S 8/003; G08G 5/02; G08G 5/025
See application file for complete search history.

(56) References Cited

U.S. PATENT DOCUMENTS

| 7,245,251 B2 | 7/2007 | Vogel et al. |
| 7,672,760 B2 | 3/2010 | Solberg et al. |
| 8,996,203 B2 * | 3/2015 | Jungwirth ............ B64D 47/02 701/3 |
| 2012/0130566 A1 * | 5/2012 | Anderson ............ G05D 1/0858 701/16 |

\* cited by examiner

*Primary Examiner* — Michael J Zanelli
(74) *Attorney, Agent, or Firm* — Lorenz & Kopf, LLP

(57) ABSTRACT

Systems and methods for an auto-land system for a rotorcraft are provided. The system includes, a search light (SL) assembly configured to receive user input directing the SL to a point of interest (POI) and determine an actual SL orientation and an actual SL range to the POI; and, a searchlight controller operationally coupled to the search light assembly, and configured to: responsive to receiving a command to auto-land at the POI, begin (i) generating a desired trajectory from the rotorcraft actual orientation and rotorcraft actual range to the POI; (ii) generating guidance commands for navigating the rotorcraft in accordance with the desired trajectory; (iii) monitoring an actual SL range and an actual SL orientation; and (iv) generating controlling commands for the searchlight assembly in accordance with the coordinates of the POI.

20 Claims, 5 Drawing Sheets

SEARCHLIGHT AUTO-LAND SYSTEM

TECHNICAL FIELD

The technical field generally relates to navigational aids, and more particularly relates to systems and methods that provide auto-landing guidance for a rotorcraft.

BACKGROUND

Landing a rotorcraft is a difficult technical task, as the pilot must monitor the environmental surrounding in addition to keeping an eye on head down displays. This technical task is further aggravated in situations in which the pilot must land on an off-shore oil rig, a high rise building, or when there is a lack of sufficient illumination of the surroundings. In particular, the lack of illumination of the surroundings makes it difficult to visually acquire the landing position. Further, rotorcraft usually operate in remote locations where there is low probability of finding an installation like an instrument landing system (ILS) or ground based augmentation system (GBAS) to help the rotorcraft land. Therefore, addressing this technical task and alleviating the associated cognitive demand is a technical problem to solve.

Currently, rotorcraft may employ various approaches in effort to address this technical problem. For some rotorcraft, visual guidance systems are relied upon for landing guidance. However, visual guidance systems introduce extra equipage, some of which can be complex and expensive components, such as an advanced gyro-stabilized electro-optical (EO) or infra-red (IR) camera.

Accordingly, improved landing systems and methods are desirable. The desirable system is based on an existing on-board searchlight assembly and does not require the addition of complex components. The desirable system capably assists in the complete landing operation, thereby providing an "auto-land" function that does not require additional user interaction. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An auto-land system for a rotorcraft is provided, including: a search light assembly comprising a search light (SL) and configured to determine an actual SL position and an actual SL range; an inertial reference system configured to provide a rotorcraft actual orientation and rotorcraft actual range; a user input device; and a control module operationally coupled to the search light assembly, the inertial reference system, and the user input device, the control module configured to: receive user input directing the searchlight to a point of interest (POI); command the search light assembly to orient the SL on the POI; determine coordinates of the POI; receive a command to auto-land at the POI; responsive to receiving the command to auto-land, begin an auto-land operation by (i) generating a desired trajectory from the rotorcraft actual orientation and rotorcraft actual range to the POI; and (ii) generating guidance commands for navigating the rotorcraft in accordance with the desired trajectory.

Also provided is a method for an auto-land system for a rotorcraft. The method includes: at a control module, continuously receiving actual rotorcraft state data from a rotorcraft inertial navigation system; continuously receiving searchlight state data for a searchlight (SL), including orientation and range values associated with locations on which the SL is focused; receiving a user input command to auto-land on a selected position of interest (POI) on which the SL is focused; responsive to receiving the command to auto-land, beginning an auto-land operation by (i) generating a desired trajectory from a rotorcraft actual orientation and a rotorcraft actual range to the POI; and (ii) generating guidance commands for navigating the rotorcraft in accordance with the desired trajectory.

An embodiment of a rotorcraft having an auto-land system is provided. The rotorcraft including: a searchlight assembly comprising a search light (SL), the searchlight assembly configured to receive user input directing the SL to a point of interest (POI) and determine an actual SL orientation and an actual SL range to the POI; an inertial reference system configured to provide a rotorcraft actual orientation and rotorcraft actual range; a user input device; and a searchlight controller operationally coupled to the search light assembly, the inertial reference system, and the user input device, the search light controller configured to: receive a command to auto-land at the POI; determine coordinates of the POI; responsive to receiving the command to auto-land, begin an auto-land operation by (i) generating a desired trajectory from the rotorcraft actual orientation and rotorcraft actual range to the POI; (ii) generating guidance commands for navigating the rotorcraft in accordance with the desired trajectory; (iii) monitoring an actual SL range and an actual SL orientation; and (iv) generating controlling commands for the searchlight assembly in accordance with the coordinates of the POI.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Figure 1:
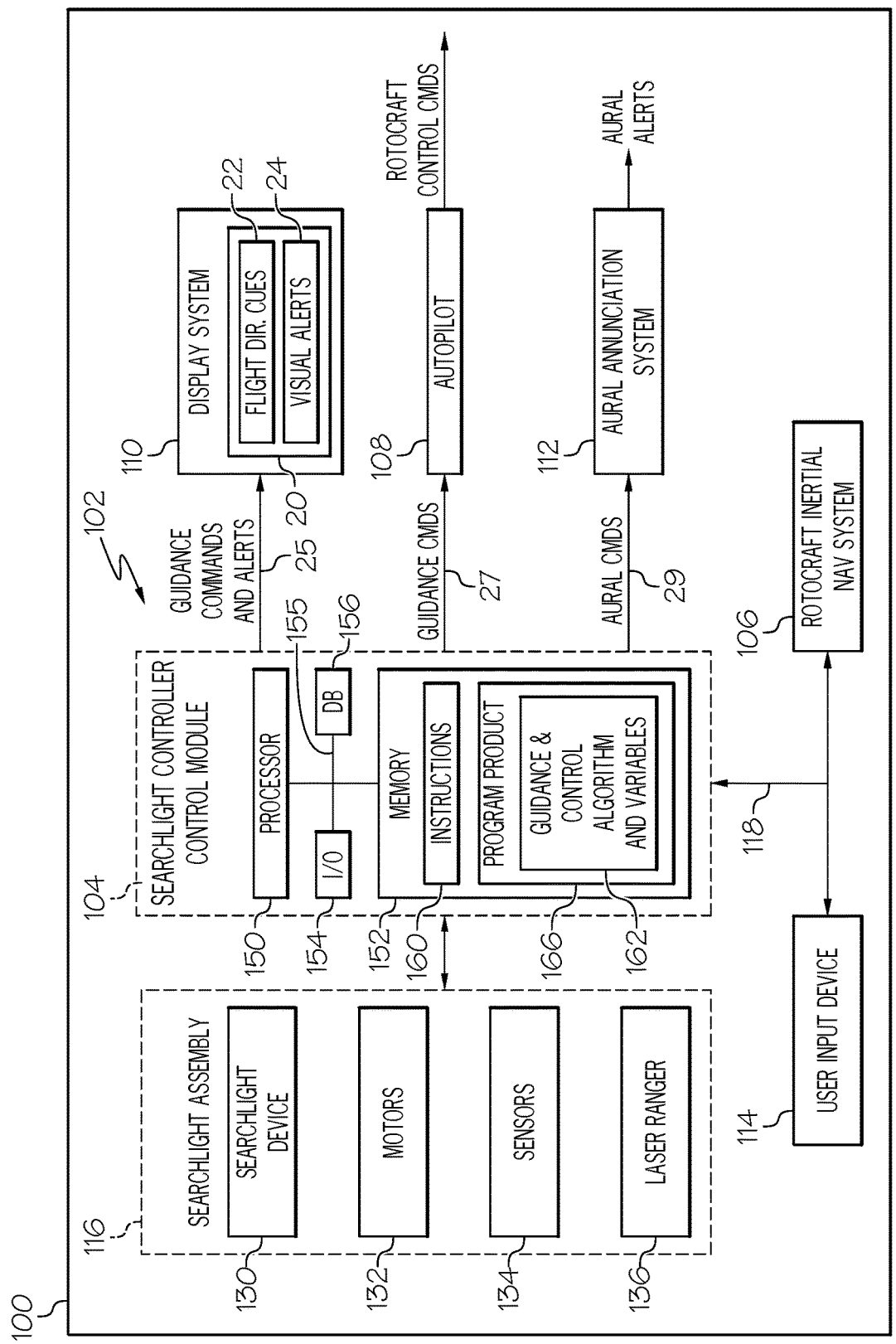
FIG. 1 is a block diagram of a CASAL system, in accordance with an exemplary embodiment.

As mentioned, landing a rotorcraft is a difficult technical task that requires that the pilot concurrently monitor the environmental surrounding and keep an eye on various head down displays in the cockpit, and this technical task is further aggravated in situations in which there is a lack of illumination in the surroundings. A technical problem is presented in utilizing systems and methods to alleviate the cognitive demands of this technical task and improve the human-machine interface during this task. Current navigational and landing guidance aids that are used as a solution to this technical problem have drawbacks, such as by requiring extra equipage and complex components, such as an advanced gyro-stabilized electro-optical (EO) or infrared (IR) camera. The present invention introduces a novel technical solution and approach to this problem. The proposed solution is a technologically improved landing guidance system and method that employs a unique connected strategy that connects an existing on-board smart searchlight with existing on-board flight control systems and converts various inputs into novel auto-land guidance. This disclosure may be referred to as a Connected Advanced Searchlight Auto-Land (CASAL) system (FIG. 1, system 102). The CASAL system 102 is referred to herein as an "auto-land" system because, once the pilot has locked the selected landing location, the CASAL system 102 capably generates the guidance commands to maneuver the rotorcraft from an initial location, at which the lock was made, to the selected landing location, without further pilot interaction. Core functionality provided by this proposed connected strategy includes:

Illuminating a selected landing location;
Locking onto the selected landing location; and
Generate auto-land guidance commands to direct the rotorcraft to auto-land on the selected landing location The proposed CASAL system 102 is an easy augmentation for any rotorcraft equipped with a smart searchlight and does not require any special or additional instrumentation and equipage. Additionally, the generated auto-land guidance commands can be adapted to command an automatic flight control system (AFCS) and/or to command flight director symbology, in the form of display cues on a primary flight display (PFD) that the pilot can simply follow to maneuver the rotorcraft to the selected landing location. The figures and descriptions below provide more detail.

Exemplary embodiments of the CASAL system 102 provide a technical solution in the form of a search light controller (also referred to herein as a control module, FIG. 1, control module 104) embodying novel rules and parameters. The disclosed control module 104 receives a user selected lock on a landing location. The landing location is defined as a position and a range or distance from an on-board search light. The control module 104 generates guidance commands for a rotorcraft based on the locked landing location.

Turning now to FIG. 1, in an embodiment, the CASAL system 102 (also referred to herein as "system" 102) is generally associated with a mobile platform 100. In various embodiments, the mobile platform 100 is a rotorcraft, and is referred to as rotorcraft 100. The system 102 embodies the control module 104. In some embodiments, the control module 104 may be integrated within a preexisting mobile platform management system, avionics system, cockpit display system (CDS), flight controls system (FCS), or rotorcraft flight management system (FMS). Although the control module 104 is shown as an independent functional block, onboard the rotorcraft 100, in other embodiments, it may exist in an electronic flight bag (EFB) or portable electronic device (PED), such as a tablet, cellular phone, or the like. In embodiments in which the control module is within an EFB or a PED, the display system 110 and user input device 114 may also be part of the EFB or PED.

The control module 104 may be operationally coupled to any combination of the following rotorcraft systems: a communication system and fabric 118; a rotorcraft inertial navigation system 106; an autopilot system 108; a display system 110; an aural annunciation system 112; a user input device 114; and, a searchlight assembly 116. The functions of these rotorcraft systems, and their interaction, are described in more detail below.

In some embodiments, the searchlight assembly 116 is referred to as a smart searchlight. Searchlight assembly comprises a searchlight (also referred to herein as "SL," and as a searchlight device 130). The SL 130 emits a beam of light from a portion called a light head; the beam of light illuminates a spot or object on which the beam of light impinges. The searchlight assembly also comprises motors 132 for controlling the orientation of the searchlight device 130 (as used herein, the orientation of the SL 150 refers to the orientation of the SL light head with respect to earth). In an embodiment, the orientation is measured in Euler angles. In operation, the SL 150 may have two control angles: Pan (Azimuth) and Tilt (Elevation). These control angles can be measured, for example, using encoders in each control joint. By mounting the searchlight assembly 116, and hence the SL 150, to the rotorcraft 100, a fixed relationship between the SL light head and the rotorcraft's 100 inertial frame can provide homogenous transformation of orientation values between the rotorcraft 100 and the SL 130. Using these two measured angular control angles, one can arrive at the searchlight orientation with respect to earth. In other embodiments, the searchlight assembly 116 is equipped with an inertial sensor, among sensors 134, from which the orientation w.r.t earth may be obtained.

The sensors 134 detect orientation and configuration status of the searchlight device 130 and convert this status information into electrical signals for processing. The laser ranger 136 is configured to determine a distance from the SL 130 to an illuminated spot, the distance being referred to herein referred as a slant range, or simply "range." As a functional block, the searchlight assembly 116 is configured to determine and provide an actual SL orientation and an actual SL range to a location referred to as a point of interest (POI).

In some embodiments, real-time rotorcraft state data is generated by the rotorcraft inertial navigation system 106. Real-time rotorcraft state data may include any of: an instantaneous location (e.g., the latitude, longitude, orientation), an instantaneous heading (i.e., the direction the rotorcraft is traveling in relative to some reference), a flight path angle, a vertical speed, a ground speed, an instantaneous altitude (or height above ground level), and a current phase of flight of the rotorcraft 100. As used herein, "real-time" is interchangeable with current and instantaneous. The rotorcraft inertial navigation system 106 may be realized as including a satellite navigation system (GNSS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the data referred to herein as the real-time rotorcraft state data may be referred to as navigation data. The real-time rotorcraft state data is made available, generally by way of the communication system and fabric 118, so other components, such as the control module 104 and the display system 110, may further process and/or handle the rotorcraft state data.

The rotorcraft inertial navigation system 106 may provide an active trajectory that includes a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). As such, an active trajectory may be part of an operational flight plan (OFP). The rotorcraft inertial navigation system 106 may include a storage location, such as a navigation database, that may also maintain flight plans, and/or information regarding terrain and airports and/or other potential landing locations (or destinations) for the rotorcraft 100.

In various embodiments, the communications system and fabric 118 is configured to support instantaneous (i.e., real time or current) communications between on-board systems, the control module 104, and one or more external data source(s). The communications system and fabric 118 may incorporate one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink, and any other suitable radio communication system that supports communications between the rotorcraft 100 and various external source(s).

The user input device 114 and the control module 104 are cooperatively configured to allow a user (e.g., a pilot, co-pilot, or crew member) to interact with display devices in the display system 110 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 110. As used herein, the user input device 114 may be used by a pilot to communicate with external sources, to modify or upload the program product 166, etc. In various embodiments, the display system 110 and user input device 114 are onboard the rotorcraft 100 and are also operationally coupled to the communication system and fabric 118. In some embodiments, the control module 104, user input device 114, and display system 110 are configured as a control display unit (CDU).

In various embodiments, the control module 104, alone, or as part of a central management computer (CMS) or a flight management system (FMS), draws upon data and information from the rotorcraft inertial navigation system 106 and searchlight assembly 116 to provide real-time landing guidance for rotorcraft 100. The real-time landing guidance may be provided to a user by way of images on the display system 110 (such as flight director cues 22 and visual alerts 24), audible emissions from an aural annunciation system 112, or the like.

The control module 104 may perform display processing. As such, the control module 104 generates display commands for the display system 110 to cause the display device 20 to render thereon the flight director cues 22 and visual alerts 24, comprising various graphical user interface elements, tables, icons, alerts, menus, buttons, and pictorial images, as described herein. The display system 110 is configured to continuously receive and process the display commands from the control module 104. The display system 110 includes a display device 20 for presenting the flight director cues 22 and visual alerts 24. In various embodiments described herein, the display system 110 includes a synthetic vision system (SVS), and one or more of the flight director cues 22 and visual alerts 24 comprises a SVS image. In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

The control module 104 may perform graphical processing. Responsive to display commands, renderings on the display system 110 may be processed by a graphics system, components of which may be integrated into the display system 110 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 may be said to display various images and selectable options described herein. In practice, this may mean that the control module 104 generates display commands, and, responsive to receiving the display commands from the control module 104, the display system 110 displays, renders, or otherwise visually conveys on the display device 20, the graphical images associated with operation of the rotorcraft 100, and specifically, the graphical images as directed by the control module 104.

In various embodiments, the rotorcraft inertial navigation system 106 includes one or more databases that provide terrain and airport feature data having therein topographical information for an airport and surrounding environment. Therefore, databases in the rotorcraft inertial navigation system 106 may include one or more of: a runway awareness and advisory system (RAAS) database and an Aerodrome Mapping Database (AMDB). In various embodiments, the databases have therein maps and geometries, including runway records with corresponding runway threshold locations. The AMDB may also include airport status data for the runways and/or taxi paths at the airport; the airport status data indicating operational status and directional information for the taxi paths (or portions thereof).

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system comprising a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external source during an initialization step of a process; it may also be programmed via a user input device 114. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, convert the processor 150/memory 152 configuration into the control module 104, which is a novel CASAL controller control module that performs the functions, techniques, and processing tasks associated with the operation of the CASAL system 102. The novel program 162 directs the processing of searchlight assembly data with real time navigation data to determine differences/deviations between position, orientation and slant range between the intended values and actual values, as described hereinbelow. Program 162 includes a novel trajectory correlation algorithm to generate guidance correction commands and send commands based thereon to a flight control system. Novel program 162 and associated stored variables 164 may be stored in a functional form on computer readable media, for example, as depicted, in memory 152. While the depicted exemplary embodiment of the control module 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 is integrated, either within the control module 104 or external to it. Accordingly, in some embodiments, the airport features data and terrain features are pre-loaded and internal to the control module 104.

The novel control module 104 may perform the functions of (i) dynamic searchlight position/orientation and range processing, (ii) guidance command generation, (iii) display processing, e.g., generating display commands, and (iv) graphical processing. In executing these functions, the processor 150 specifically loads the instructions embodied in the program 162, thereby being programmed with program 162. During execution of program 162, the processor 150, the memory 152, and the database DB 156 and I/O 154 form novel dynamic searchlight position and orientation processing, guidance command generation, display processing, and graphical processing engines that perform the functions and tasks of the system 102.

Figure 2:
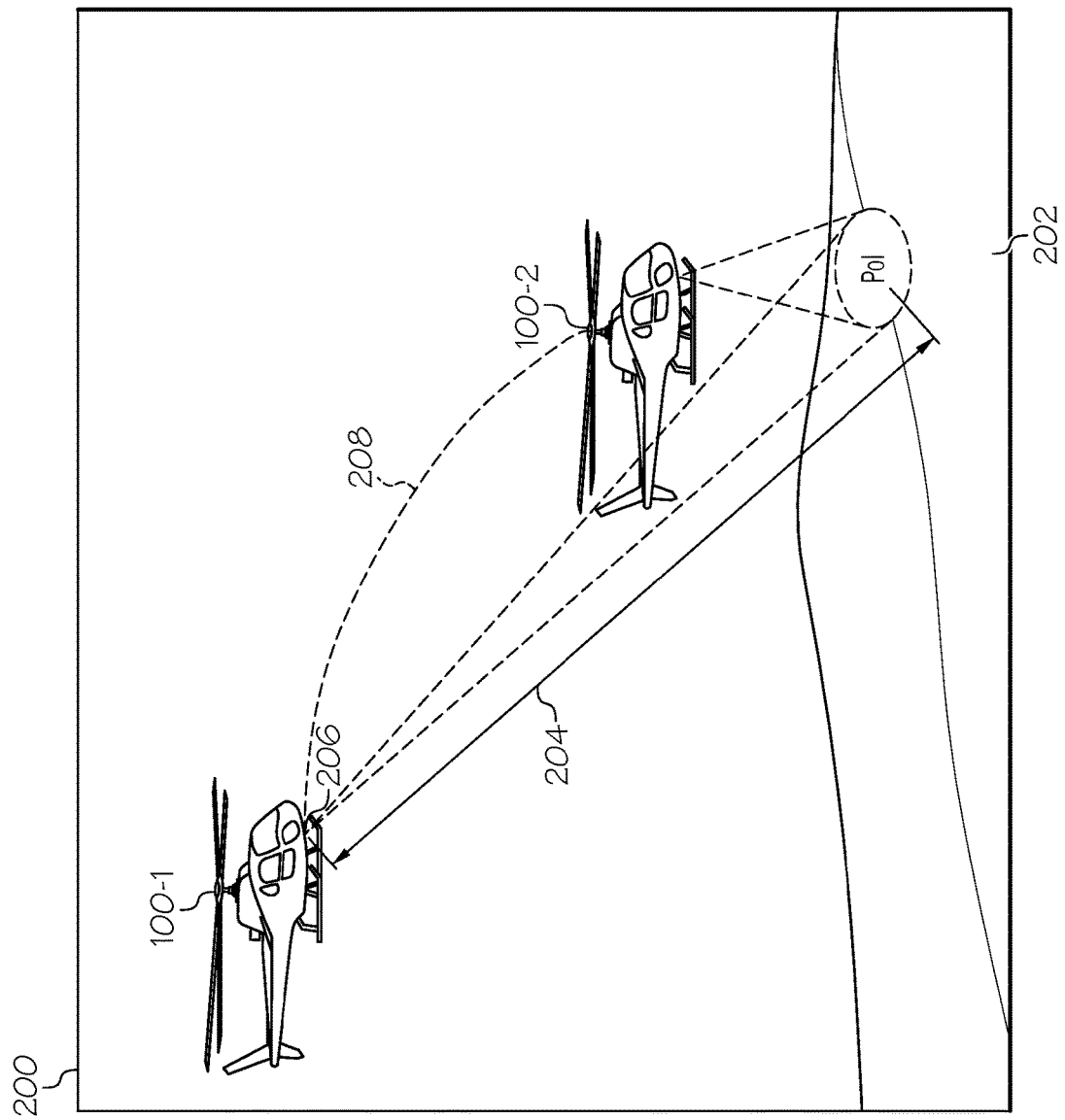
FIGS. 2-3 are illustrations depicting use cases for the CASAL system, in accordance with an exemplary embodiment.
Figure 3:
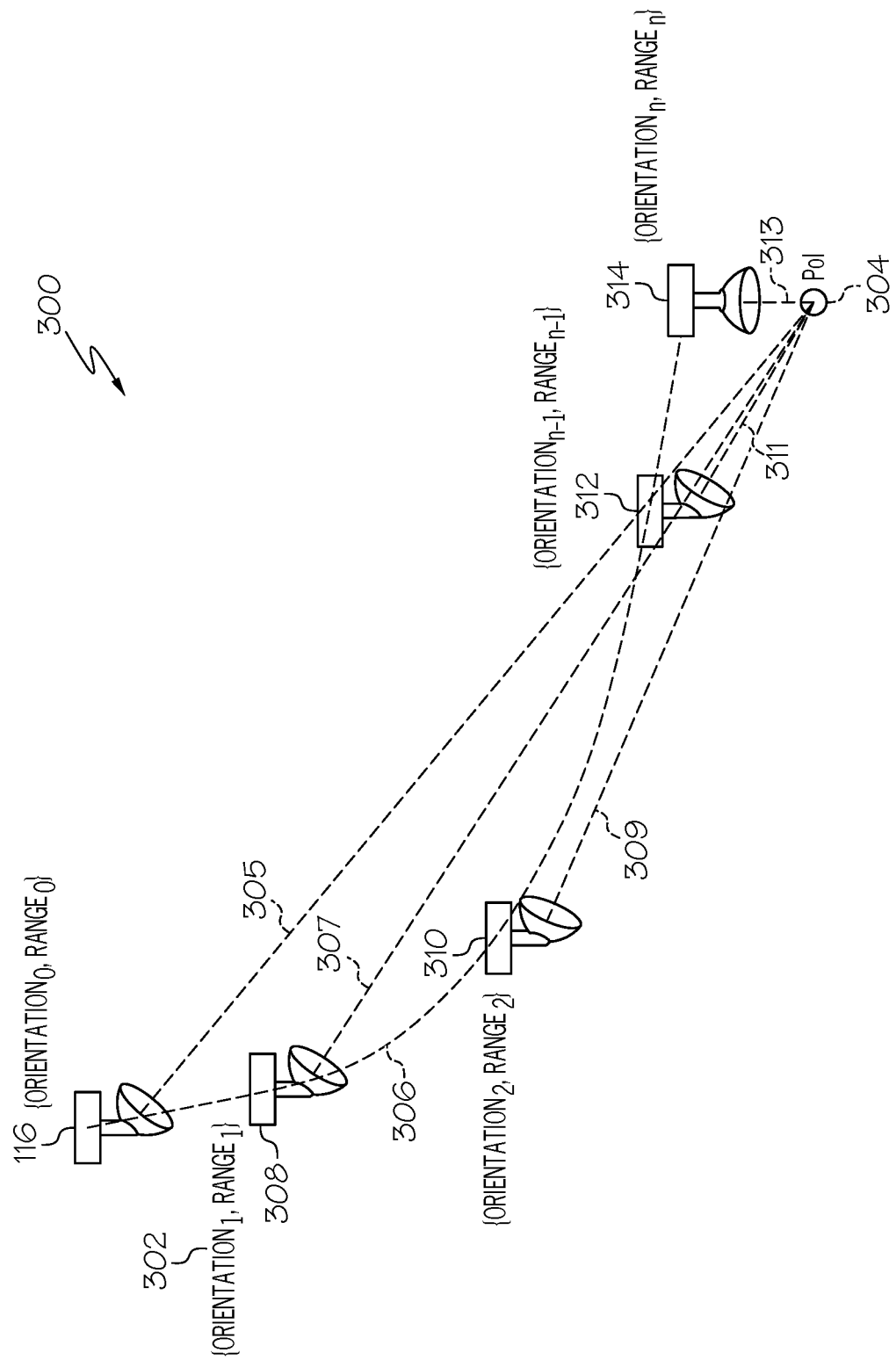

FIGS. 2-3 provide examples of the novel system 102 in operation. In FIGS. 2-3, examples of a searchlight assembly 116 being controlled by the control module 104 are shown. Prior to engaging the CASAL system 102, the rotorcraft 100 is airborne, and the searchlight device 130 may be utilized in respects outside of the scope of this invention. At the point in time at which the pilot wants to select a landing location, the pilot or crew manually direct the searchlight device 130 to illuminate a landing location. When the pilot or crew determines that the illuminated location is the desired landing location, the pilot or crew provides user input indicating a lock on the landing location, and this location is now referred to as a selected landing location and/or position of interest (POI). The system 102 determines coordinates of the POI 202. In the example depicted, this occurs when the rotorcraft 100 is at initial position 100-1. At initial position 100-1, when the position of interest (POI 202) is locked, the searchlight device 130 is (i) located at a distance from the POI 202 referred to as a range 204, and (ii) configured with an angle of orientation 206, measured from a plane bisecting the rotorcraft horizontally, to the POI 202. The range 204 and orientation 206 are stored and processed to generate therefrom a desired trajectory 208 that is a path from the initial position 100-1 to the POI 202. The system 102 generates the desired trajectory 208 and concurrent therewith are guidance instructions sufficient to guide the rotorcraft 100 from its initial position 100-1 to a safe landing on the POI 202.

As may be appreciated, the desired trajectory 208 comprises a series of points, and each point of the series of points making up the desired trajectory 208 has a respective intended orientation and intended range. The rotorcraft 100 responds to the auto landing guidance and attempts to have a travel path that is equal to the desired trajectory 208. The travel path of the rotorcraft is described by the rotorcraft state data and comprises actual position/orientation/distances from the POI 202. During operation, the system 102 monitors various inputs, including the rotorcraft state data from the rotorcraft inertial navigation system 106, and compares an actual travel path to the desired trajectory 208. In doing so, the system 102 compares, at each point in a series of points, a rotorcraft actual orientation and actual range with a respective intended orientation and respective intended range; when there is a difference between the two, the system 102 may reference a pre-programmed distance threshold and/or a pre-programmed orientation threshold to serve as a maximum deviation to allow before generating a correctional guidance command. The system 102 may perform these comparisons in increments of time or distance as the rotorcraft 100 travels toward the POI 202 and until the rotorcraft 100 has completed its landing operation. As part of the automatic guidance, or auto-land guidance, aspect of the system 102, the system 102 generates correctional guidance commands in real time as the rotorcraft 100 travels toward the POI 202 based on the results of this monitoring and comparing. The correctional guidance commands a subset of the guidance commands generated by the system 102 and are directed to maneuvering the rotorcraft back onto the desired trajectory 208. In this manner, the system 102 validates the trajectory adherence. In some embodiments, the correctional guidance commands are short intermittent guidance correction commands while the rotorcraft 100 continues with the auto-land operation.

As mentioned, auto-land guidance provided by the system 102 may be guidance commands (25, 27, and 29) adapted to a variety of on-board systems, as follows. In various embodiments, auto-land guidance provided by the system 102 includes guidance commands 25 that provide display and graphic command for flight director cues 22 and/or visual alerts 24 on the display system 110. The system 102 may generate correctional guidance commands for an automatic flight control system (AFCS). In various embodiments, auto-land guidance provided by the system 102 includes autopilot guidance commands 27 for an autopilot system 108, from which the autopilot system 108 may generate rotorcraft control commands. In addition, auto-land guidance provided by the system 102 may include aural commands 29 generated for the aural annunciation system 112 to generate therefrom aural alerts The CASAL system 102 also connects and coordinates the searchlight assembly operation with the auto-land guidance as the rotorcraft travels its travel path from initial position 100-1 to its landing site. In doing so, the system 102 continually adjusts and maneuvers the direction of the beam of light produced by the searchlight device 130 such that it continues to illuminate the selected POI 202 along the travel path. The system 102 adjusts and maneuvers the direction of the beam of light by sending controlling commands to the searchlight assembly 116 for one or more of the controlling motors 132, sensors 134, and the laser ranger 136. This functionality is depicted in FIG. 3.

With reference to FIG. 3, the searchlight assembly 116 is initially locked on POI 304, having at the point of lock, orientation and range 302. A beam of light 305 is shown to indicate the illuminating light produced by the searchlight device 130 and impinging on the POI 304. In this example, travelpath 306 is shown, representing the actual travelpath of the rotorcraft 100. At point 308 with beam of light 307, at point 310 with beam of light 309, at point 312 with beam of light 311, and at point 314 with beam of light 313, the system 102 adjusts and maneuvers the direction of the beam of light. In maneuvering the direction of the beam of light, previously stored coordinates of the POI 304 are referenced, and the actual SL orientation and actual SL range of the searchlight device 130 are monitored and may be compared to the coordinates of the POI and/or to a desired trajectory (e.g., desired trajectory 208); controlling commands for the searchlight assembly 116 may be generated based on the coordinates of the POI or the desired trajectory. Although only four points on the travelpath 306 are shown in the example, it is to be appreciated that there may be a plurality of points determined based on interval of time and/or distance, along the travelpath 306 at the system 102 adjusts and maneuvers the direction of the beam of light.

Figure 4:
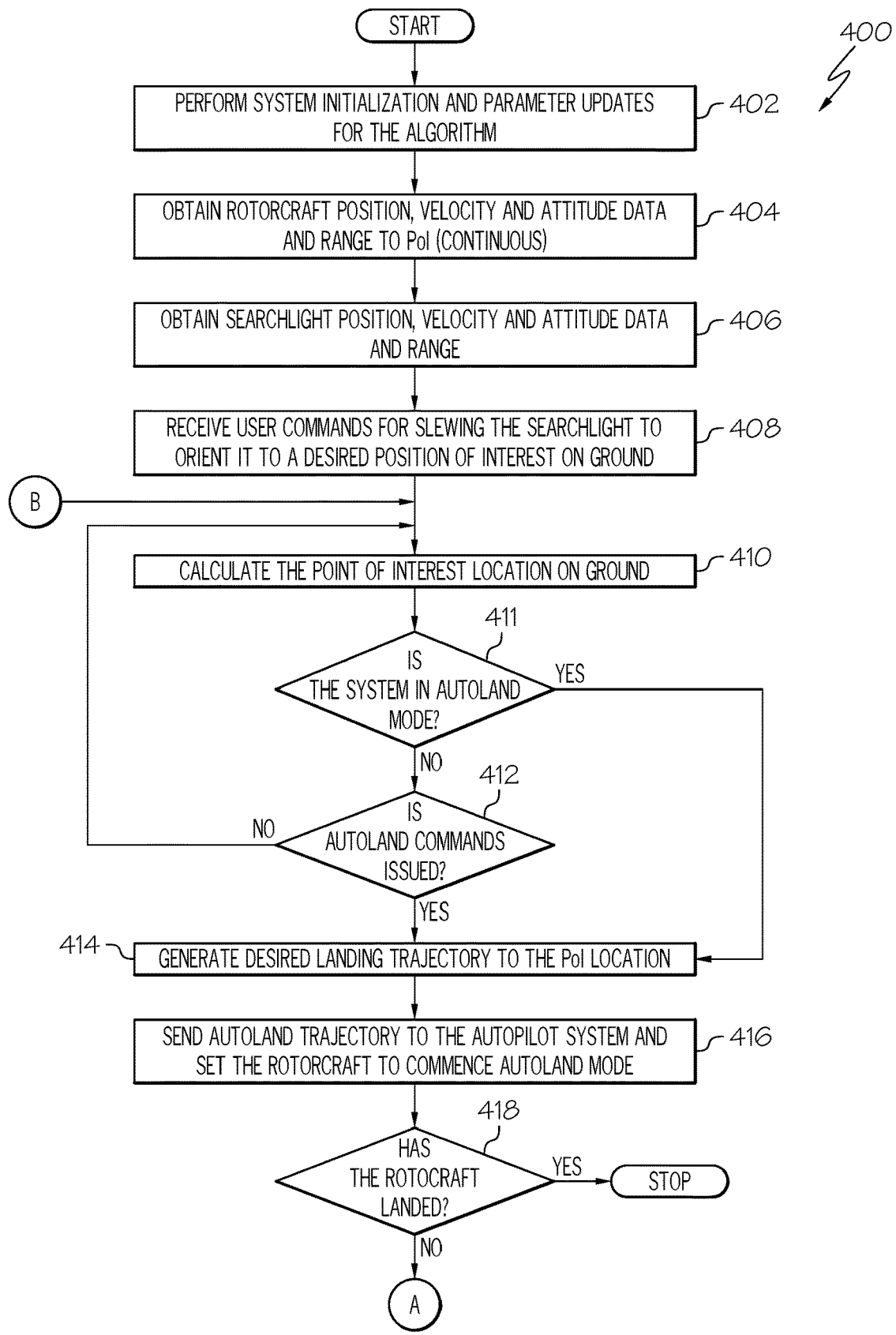
FIGS. 4-5 depict a method for a CASAL system, in accordance with an exemplary embodiment.
Figure 5:
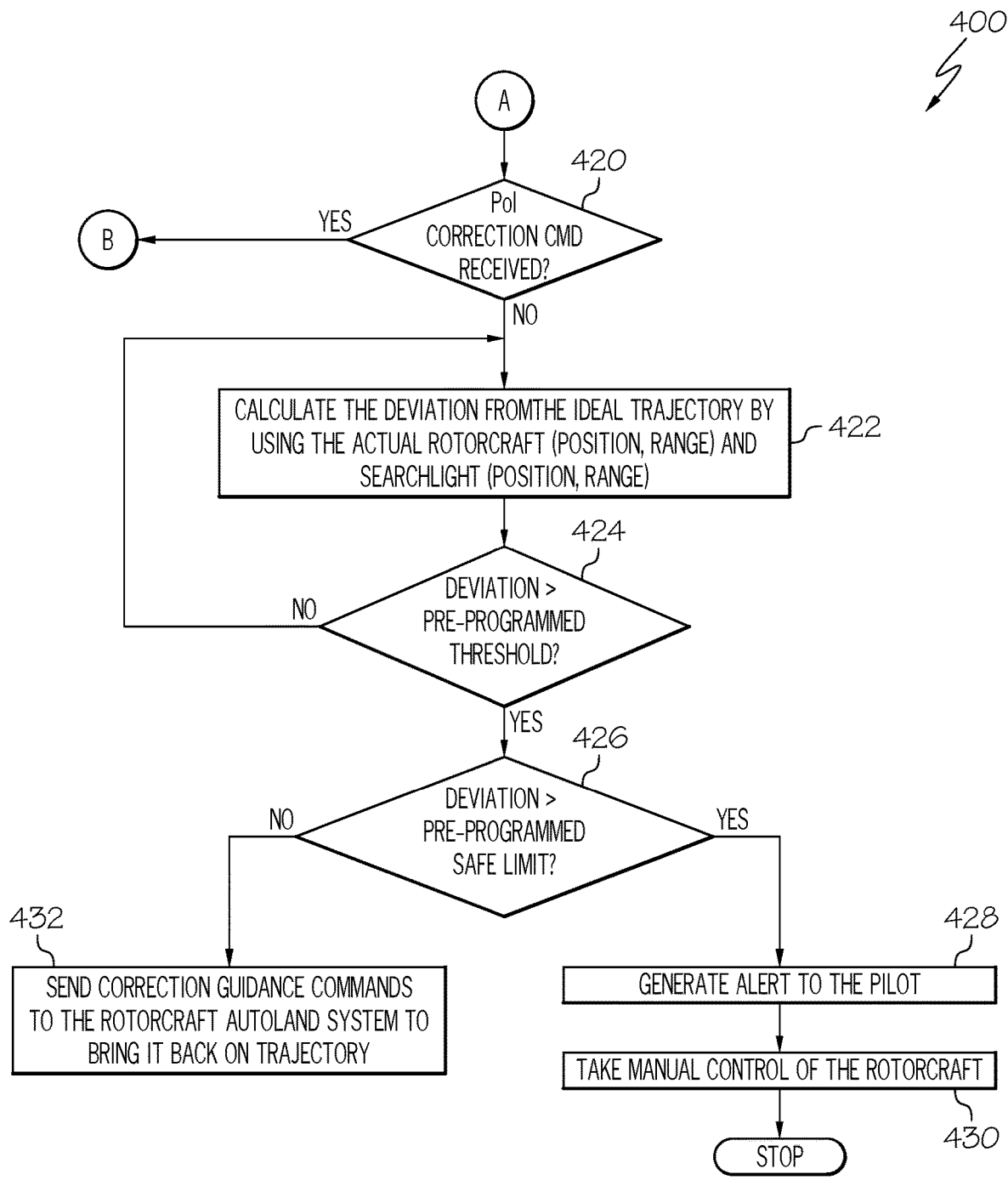

The system 102 may make its determinations and selections in accordance with a method such as method 400 of FIGS. 4 and 5. With continued reference to FIGS. 1-3, a flow chart is provided for a method 400 for providing a system 102, in accordance with various exemplary embodiments. Method 400 represents various embodiments of a method for adaptive clearance for landing request prediction. For illustrative purposes, the following description of method 400 may refer to elements mentioned above in connection with FIG. 1. In practice, portions of method 400 may be performed by different components of the described system. It should be appreciated that method 500 may include any number of additional or alternative tasks, the tasks shown in FIGS. 4 and 5 need not be performed in the illustrated order, and method 400 may be incorporated into a more comprehensive procedure or method having additional functionality not described in detail herein. Moreover, one or more of the tasks shown in FIG. 5 could be omitted from an embodiment of the method 400 if the intended overall functionality remains intact.

The method starts, and at 402 the control module 104 is initialized and the system 102 is in operation. Initialization may comprise uploading or updating instructions and applications 160, program 162, parameters for the rotorcraft 100, Searchlight assembly 116 and controller module 104, pre-programmed thresholds, lookup tables, and formatting instructions. Parameters may include, for example, configurable, pre-programmed range and orientation thresholds, parameters for setting up a user interface, and the various shapes, various colors and/or visually distinguishing techniques, flight director cues 22, and related visual alerts 24. In some embodiments, program 162 includes additional instructions and rules for rendering information differently based on type of display device 20 in display system 110.

At 404, rotorcraft state data is continuously obtained from the rotorcraft inertial navigation system 106. At 406, a searchlight device 130 position with respect to the rotorcraft is obtained, and real-time state data for the searchlight device 130 is continuously obtained, including orientation and range values with the help of sensors 134 and laser ranger 136 associated with any locations on the ground or places on which the beam of light from the searchlight device 130 is focused. At 408, user input commands are received that direct the searchlight device 130 to lock on a selected location or position of interest (POI). At 410, the coordinate value of the POI with respect to the rotorcraft is determined using the components and measurements provided by the searchlight assembly 116. At 411, if the system is in autoland mode, it proceeds to 414. At 411, if the system is not in autoland mode, it proceeds to 412 to determine whether autoland commands have been issued. When the auto-land commands are not issued at 412, the method cycles back to 410.

When the auto-land commands are issued at 412, the coordinates of the position of interest (POI) calculated in 410 is considered as designated by the operator and to provide guidance for the rotorcraft 100 to land at the POI. The fact that the searchlight assembly 116 is now used as an aid to generate a desired trajectory 208 for the rotorcraft 100 to land at the POI and for generation of guidance commands to guide the rotorcraft 100 to remain on the desired trajectory 208 by issuing autoland commands connecting this with a rotorcraft flight control system at 412 makes this method a unique proposition. The desired trajectory 208 is generated at 414, and auto-land guidance commands are sent at 416. Step 416 may include commands 27 to the autopilot system 108 commands 25 to the display system 110 and/or commands 29 to the aural annunciation system 112.

If the rotorcraft 100 has landed at 418, the method may stop. If the rotorcraft 100 has not landed at 418, the method determines whether there has been a user input correction/change to the selected POI at 420, and if there has been one, the method returns to 410 to recalculate orientation and range to the POI. As the corrections are intermittent, 434 determines if the system 102 is already in the auto-land phase and therefore will skip 412 thereby not needing an explicit re-issue of the auto-land command. If no correction/change to the selected POI is received at 420, the method begins trajectory verification at 422, wherein it compares a rotorcraft actual orientation and actual range with a respective intended orientation and respective intended range. When there is a difference or deviation between the two at 424 and the deviation exceeds a pre-programmed safe limit at 426, the method generates and alert to the pilot at 428 and may accept reversion to manual control of the rotorcraft at 430. When there is a difference or deviation between the two at 424 but the deviation is less than the pre-programmed safe limit at 426, the method generates correction guidance commands for bringing the rotorcraft back to the desired trajectory 208 at 432. The rotorcraft automatic flight control system (AFCS) may use the received commands to generate maneuver commands to keep the rotorcraft 100 on the desired trajectory 208. The operation of method 400 may continue many times a second until the selected POI is arrived at, thereby providing smooth autoland guidance during the entire autoland operation.

As mentioned, the system 102 commands and controls the SL or searchlight device 130 to continue to illuminate the locked POI as the rotorcraft translates on its travel path from its initial position, without a dependency on visual aid such as an EO/IR camera. The system 102 may further reference a database of OEM specifications and requirements and generate the desired trajectory 208 as a customized trajectory reflecting the OEM requirements and rotorcraft's physical limits.

Thus, the proposed CASAL system 102 is a technologically improved landing guidance system and method for a rotorcraft. The CASAL system 102 enables easy augmentation for any rotorcraft equipped with a smart searchlight assembly and does not require any special or additional instrumentation and equipage. Additionally, the generated auto-land guidance commands can be adapted to command an automatic flight control system (AFCS) and/or to command flight director symbology, in the form of display cues on a primary flight display (PFD) that the pilot can simply follow to maneuver the rotorcraft to the selected landing location. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An auto-land system for a rotorcraft, comprising:
a search light assembly comprising a search light (SL) and configured to determine an actual SL position and an actual SL range, defined as a distance from the SL to a location referred to as a point of interest (POI);
an inertial reference system configured to provide a rotorcraft actual orientation and rotorcraft instantaneous location;
a user input device; and
a control module operationally coupled to the search light assembly, the inertial reference system, and the user input device, the control module configured to:
receive user input directing the searchlight to the point of interest (POI);
command the search light assembly to orient the SL on the POI;
determine coordinates of the POI based on the rotorcraft instantaneous location and the user directed POI;
receive a command to auto-land at the POI;
responsive to receiving the command to auto-land, begin an auto-land operation by
(i) generating a desired trajectory from the rotorcraft actual orientation and rotorcraft actual range to the POI; and
(ii) generating guidance commands for navigating the rotorcraft in accordance with the desired trajectory.

2. The system of claim 1, wherein the guidance commands include commands for an autopilot system.

3. The system of claim 1, wherein the guidance commands include commands for a display system to display flight director cues.

4. The system of claim 1, wherein the control module is further configured to:
determine whether the rotorcraft has landed;
end the auto-land operation when the rotorcraft has landed; and
compare a rotorcraft actual orientation and actual range with a respective intended orientation and respective intended range, when the rotorcraft has not landed.

5. The system of claim 4, wherein the control module is further configured to:
determine when (A) a first deviation between the rotorcraft actual orientation and the respective intended orientation exceeds a first pre-program threshold; and
responsive to A, generate a respective correctional guidance command.

6. The system of claim 5, wherein the control module is further configured to:
determine when (B) a second deviation between the rotorcraft actual range and the respective intended range exceeds a second pre-program threshold; and
responsive B, generate a respective correctional guidance command.

7. The system of claim 6, wherein the control module is further configured to:
responsive to A, determine whether the first deviation is greater than a pre-programmed safe limit; and
generate an alert when the first deviation is greater than the pre-programmed safe limit, the alert being an instruction to regain manual control.

8. The system of claim 7, wherein the control module is further configured to:
responsive to B, determine whether the second deviation is greater than a respective pre-programmed safe limit; and
generate an alert when the second deviation is greater than the respective pre-programmed safe limit, the alert being an instruction to regain manual control.

9. The system of claim 8, wherein the control module is further configured to:
while in an auto-land operation, receive and process short intermittent guidance correction commands while continuing with the auto-land operation.

10. A method for an auto-land system for a rotorcraft, comprising:
at a control module, continuously receiving actual rotorcraft state data from a rotorcraft inertial navigation system;

continuously receiving searchlight state data for a searchlight (SL), including orientation and range values associated with locations on which the SL is focused;

receiving a user input command to auto-land on a selected position of interest (POI) on which the SL is focused;

responsive to receiving the command to auto-land, beginning an auto-land operation by
(i) generating a desired trajectory from a rotorcraft actual orientation and a rotorcraft actual range to the POI; and
(ii) generating guidance commands for navigating the rotorcraft in accordance with the desired trajectory.

11. The method of claim 10, wherein generating guidance commands include generating commands for an autopilot system.

12. The method of claim 11, wherein generating guidance commands include generating commands for a display system to display flight director cues.

13. The method of claim 12, further comprising:
determining whether the rotorcraft has landed;
ending the auto-land operation when the rotorcraft has landed; and
comparing a rotorcraft actual orientation and actual range with a respective intended orientation and respective intended range, when the rotorcraft has not landed.

14. The method of claim 13, further comprising:
determining when (A) a first deviation between the rotorcraft actual orientation and the respective intended orientation exceeds a first pre-program threshold; and
responsive to A, generating a respective correctional guidance command.

15. The method of claim 14, further comprising:
determining when (B) a second deviation between the rotorcraft actual range and the respective intended range exceeds a second pre-program threshold; and
responsive to B, generating a respective correctional guidance command.

16. The method of claim 14 further comprising:
responsive to A, determining whether the first deviation is greater than a pre-programmed safe limit; and
generating an alert when the first deviation is greater than the pre-programmed safe limit, the alert being an instruction to regain manual control.

17. The method of claim 15, further comprising:
responsive to B, determining whether the second deviation is greater than a respective pre-programmed safe limit; and
generating an alert when the second deviation is greater than the respective pre-programmed safe limit, the alert being an instruction to regain manual control.

18. The method of claim 17, further comprising, while continuing with an auto-land operation, receiving and processing short intermittent guidance correction commands.

19. A rotorcraft having an auto-land system, comprising:
a searchlight assembly comprising a search light (SL), the searchlight assembly configured to receive user input directing the SL to a point of interest (POI) and determine an actual SL orientation and an actual SL range to the POI;
an inertial reference system configured to provide a rotorcraft actual orientation and rotorcraft instantaneous location;
a user input device; and
a searchlight controller operationally coupled to the search light assembly, the inertial reference system, and the user input device, the search light controller configured to:
receive a command to auto-land at the POI;
determine coordinates of the POI based on the rotorcraft instantaneous location and the user directed POI;
responsive to receiving the command to auto-land, begin an auto-land operation by
(i) generating a desired trajectory from the rotorcraft actual orientation and rotorcraft actual range to the POI;
(ii) generating guidance commands for navigating the rotorcraft in accordance with the desired trajectory;
(iii) monitoring an actual SL range and an actual SL orientation; and
(iv) generating controlling commands for the searchlight assembly in accordance with the coordinates of the POI.

20. The rotorcraft of claim 19, further comprising:
determining when (A) a deviation between the rotorcraft actual orientation and the respective intended orientation exceeds a first pre-program threshold; and
determining when (B) a deviation between the rotorcraft actual range and the respective intended range exceeds a second pre-program threshold; and
responsive to A or B, generate a respective correctional guidance command.

* * * * *